Patented Nov. 22, 1949

2,489,236

UNITED STATES PATENT OFFICE 2,489,236

SYNTHESIS OF BIOTIN AND RELATED COMPOUNDS

Moses Wolf Goldberg, Upper Montclair, and Leo H. Sternbach, Montclair, N. J., assignors to Hoffmann-La Roche Inc., Roche Park, Nutley, N. J., a corporation of New Jersey No Drawing. Application July 24, 1947, Serial No. 763,447

14 Claims. (Cl. 260—309)

Our invention relates to a new method for the synthesis of biotin and related compounds, as well as to intermediates therefor. More particularly, it is concerned with the production of higher homologs of biotin having a side chain of from five to seven methylene groups and a terminal carboxyl group in 2-position of the biotin nucleus, instead of four methylene groups and a terminal carboxyl group as in the case of biotin itself. We have designated the compound which contains five methylene groups in the side-chain "homo-biotin," the compound containing six methylene groups "bis-homo-biotin" and that containing seven methylene groups "tris-homo-biotin."

In our previous application Serial No. 673,642, filed May 31, 1946, of which the instant application is a continuation-in-part, we have disclosed a new method for the synthesis of biotin. We have now found that this method may be extended to the production of higher homologs of biotin, such as the homo, bis-homo-, and tris-homo-biotin above referred to. In application, Serial No. 763,446, filed July 24, 1947, we have disclosed a method for the synthesis of nor-biotin, which has a side-chain of three methylene groups and a terminal carboxyl group in 2-position, this being a lower homolog of biotin.

Nor-biotin, and in particular the new higher homologs of biotin disclosed in the present application are biologically important compounds. All of them display a pronounced anti-biotin effect when tested with Saccharomyces cerevisiae and Lactobacillus casei, homo-biotin being the most active one. The activity against both organisms makes them unique among biotin antagonists, for none of the known anti-biotins can prevent the growth of Saccharomyces cerevisiae to any significant extent. In fact, some of them, for example, desthiobiotin and biotin sulfone, while active against Lactobacillus casei, are growth stimulants for the yeast organism.

In general, our present invention is concerned with the production of biotin and its homologs which can be represented by the following Formula I:

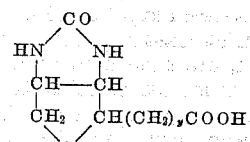

(I)

wherein $y$ represents an integer from 3 to 7.

As a starting material in our synthesis of these compounds, we employ a thiolactone which can be represented by the following Formula II:

(II)

In Formula II the radicals R and R' in the imidazolidone nucleus stand for hydrogen and radicals which can be replaced by hydrogen. Thus, either or both of the N atoms may carry hydrogen-replaceable radicals, as aralkyl radicals, for instance, α-aralkyl radicals like benzyl and α- or ring-substituted benzyl, for example, α-methyl, α-ethylbenzyl, o-methyl-benzyl, p-ethyl-benzyl, p-methoxy-benzyl, p-ethoxy-benzyl; or acyl radicals as, for example, lower acyl radicals such as acetyl, propionyl, butyryl, and the like, at least one of the R and R' radicals being a hydrogen-replaceable radical.

Methods of producing the thiolactone (II) are already described in our application, Serial No. 673,642 and application, Serial No. 761,444, filed July 16, 1947. Other intermediates employed in the preparation of this compound (II) are also described in application, Serial No. 744,152, filed April 26, 1947. The instant application is a continuation-in-part of the above mentioned applications and application, Serial No. 763,446, filed July 24, 1947.

In general, to produce the thiolactone (II), a meso-diamino-succinic acid, such as meso-bis-benzylamino-succinic acid, is reacted in an alkaline solution with phosgene to form an imidazolidone-(2)-cis-4,5-dicarboxylic acid. The last mentioned compound is dehydrated with a dehydrating agent, such as acetic anhydride, to form a 3,4-(2'-keto-imidazolido)-2,5-diketo-tetrahydrofuran. The latter is reduced with zinc in the presence of an aliphatic acid and its anhydride, such as acetic acid and acetic anhydride, to yield a 3,4-(2'-keto-imidazolido)-2-keto-5-acyloxy-tetrahydrofuran. By reacting the last mentioned product with hydrogen sulfide in an acidified solution, for instance, in an organic solvent acidified with hydrogen chloride, and then with a salt of hydrogen sulfide, such as sodium or potassium hydrosulfide, followed by reduction, as with zinc and acetic acid, the thiolactone (II) is obtained. This procedure is described in more detail in the applications already referred to above.

The following flow sheet will serve to illustrate the steps involved in the synthesis of biotin and its homologs from the thiolactone (II).

2-(ω-alkoxy-alkyl)-thiophane (III). The latter is dehydrated by treating it with a dehydrating

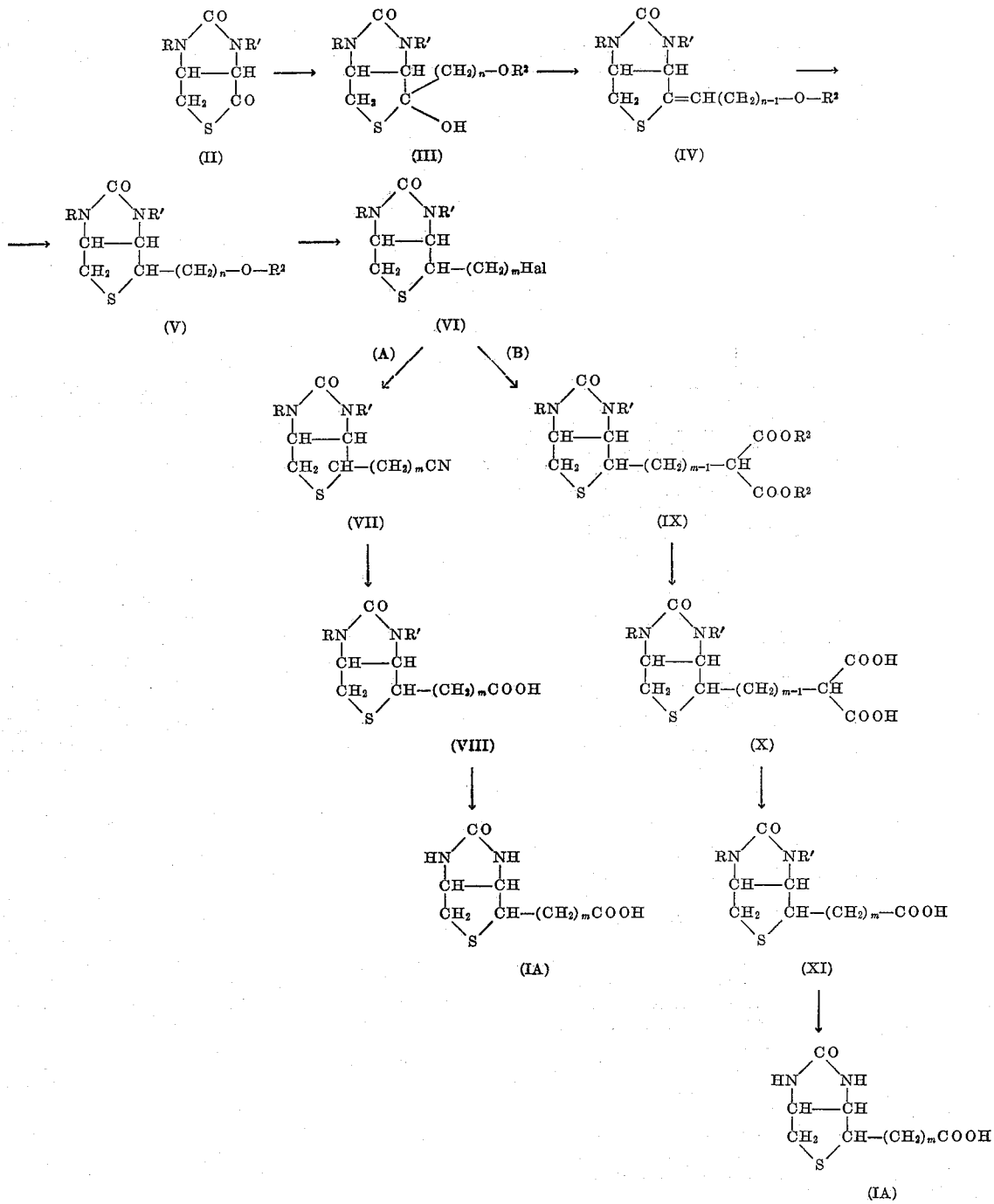

In the above scheme, R and R' have the same significance as in Formula II above, $n$ in Formulae III, IV, and V, represents an integer from 3–7, $m$ in Formulae VI–XI and IA represents an integer from 4–7, $R^2$ stands for a lower alkyl radical, such as methyl, ethyl, propyl, and the like, and Hal stands for a halogen.

The thiolactone (II) is reacted with an ω-alkoxy-alkyl-magnesium halogenide having, for example, the following formula:

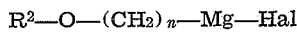

$R^2$ and $n$ having the same significance as already indicated and Hal standing for chlorine, bromine or iodine. The reaction product is a 2-hydroxyagent, such as acetic acid, to produce a 2-(ω-alkoxy-alkylidene)-thiophane (IV), which is hydrogenated to form a 2-(ω-alkoxy-alkyl)-thiophane (V). The latter can then, for example, be treated to replace one of the hydrogen-replaceable groups by hydrogen, if it contains two such groups. The 2-(ω-alkoxy-alkyl)-thiophanes (V), which contain at least four methylene groups in the side chain, are then converted into the corresponding compounds selected from the group of those having in place of the alkoxy radical a halogeno, cyano, carboxyl, CH(COOalkyl)₂ or CH(COOH)₂ radical. For this purpose, these 2-(ω-alkoxy-alkyl)-thiophanes are first treated with hydrogen halide, such as hydrogen bromide or hydrogen chloride, to form the corresponding 2-(ω-halogeno-alkyl)-thiophane (VI). The last mentioned compound may then be subjected to two series of reactions. One of these series will be designated as A and the other as B.

In series A, which corresponds to the reactions set forth in our application Serial No. 673,642, compound (VI) is treated with a cyanide, such as potassium cyanide, to form a 2-(ω-cyano-alkyl)-thiophane (VII). The last-mentioned compound is then saponified, for example, with potassium hydroxide, to form a 2-(ω-carboxy-alkyl)-thiophane (VIII). The latter is treated so as to replace the hydrogen-replaceable groups R and/or R' with hydrogen to form a compound represented by Formula IA. Where one or both of R and R' are benzyl radicals, this can be accomplished, for example, by debenzylation with sodium in liquid ammonia. Where the hydrogen-replaceable group is an acyl radical, such as acetyl, this can be replaced with hydrogen by hydrolysis.

In the other series of reactions (B), compound (VI) is condensed with a dialkyl-metallo-malonate as, for example, diethyl sodio-malonate or diethyl magnesium-malonate, to form a 2-(ω,ω-dicarbalkoxy-alkyl)-thiophane (IX). The last mentioned compound is saponified, for example, with potassium hydroxide, to form a 2-(ω,ω-di-carboxy-alkyl)-thiophane (X). The latter is decarboxylated by heating whereby it loses one molecule of carbon dioxide, to form a 2-(ω-carboxy-alkyl)-thiophane (XI). In the last step, the 2-(ω-carboxy-alkyl)-thiophanes (XI) are then treated so as to replace the hydrogen-replaceable radicals R and/or R', in the same manner as in the preparation of compound (IA) from compound (VIII). In this way, there are also formed compounds corresponding to Formula IA.

In proceeding according to the B series of reactions, it will be noted that by reacting compound (VI) with the dialkyl metallo-malonate, one additional methylene group is introduced in the side chain over that introduced by the Grignard reaction with the thiolactone (II). In case of the A series of reactions, the number of methylene groups in the side chain remains the same as introduced by the Grignard reaction.

It is to be understood that the specification and claims embrace all tautomeric forms of the compounds named or shown. Moreover, it will be understood that the compounds having a single hydrogen-replaceable radical, represented by R or R', as benzyl or acyl, can obtain this radical either in the 1' or the 3' position.

The following examples will serve to illustrate the production of biotin, wherein the thiolactone (II) is reacted with with 4-ethoxy-butyl-magnesium bromide in place of 4-methoxy-butyl-magnesium bromide as set forth in our application Serial No. 673,642. The subsequent steps correspond to those in the aforesaid application.

EXAMPLE 1

*3,4 - (1',3'-dibenzyl-2'-keto-imidazolido)-2-hydroxy-2-(ω-ethoxy-butyl)-thiophane or (in its open form) 1,3 - dibenzyl - cis - 4 - mercapto-methyl-2-(ω-ethoxyvaleryl)-imidazolidone-2*

A Grignard solution, prepared from 8.5 grams 4-ethoxy-butylbromide and an excess of magnesium (2.4 grams) in 15 cc. of ether and 5 cc. of benzene, is diluted with benzene, decanted from the unreacted magnesium and added dropwise (in about 30 minutes) to a boiling, stirred solution of 13.5 grams of 3,4-(1',3'-dibenzyl-2'-keto-imidazolido)-2-keto-thiophane (thiolactone) in 160 cc. of benzene. The solution is then kept refluxing for another 2½ hours. The mixture is decomposed with ice and dilute sulfuric acid, the organic layer is separated and concentrated in vacuo. The residue is dissolved in methanol and heated to 50° C. with an excess of aqueous sodium hydroxide solution. Ether and water are added, and the 2 layers are separated. The alkaline aqueous solution contains the unreacted thiolactone, which is extracted and recovered after acidification. The ether layer containing the reaction product is dried, and concentrated in vacuo. The residue is recrystallized from a mixture of acetone, ether, and petrol-ether, and forms thick plates melting at 115-115.5° C.

EXAMPLE 2

*3,4 - (1',3' - dibenzyl-2'-keto-imidazolido)-2-(ω-ethoxy-butylidene)-thiophane*

A solution of 20.0 grams of 3,4-(1',3'-dibenzyl-2 - keto - imidazolido)-2-hydroxy-2-(ω-ethoxy-butyl)-thiophane in 100 cc. acetic acid is refluxed for 1½ hours. The solution is concentrated in vacuo, the residue is dissolved in ether and the solution is washed with dilute sodium carbonate solution. The ether solution is dried and concentrated in vacuo. The oily residue represents the unsaturated ω-ethoxy-butylidene compound. The yield is quantitative. The product can be recrystallized from a mixture of ether and petrol-ether and forms crystals melting at 56-58° C.

EXAMPLE 3

*3,4 - (1',3' - dibenzyl-2'-keto-imidazolido)-2-(ω-ethoxybutyl)-thiophane*

The 3,4-(1',3'-dibenzyl-2'-keto-imidazolido)-2-(ω-ethoxy-butylidene)-thiophane (20 grams), obtained in the previous example, is dissolved in 150 cc. of methanol and hydrogenated in presence of 20-40 grams Raney nickel catalyst at room temperature and atmospheric pressure. The calculated amount of hydrogen is taken up in 30 hours. Palladium catalysts, as for example palladium on charcoal, palladium on barium sulfate and palladium oxide, can also be used. The catalyst is filtered off and the solution is concentrated in vacuo. The hydrogenation product is used without further purification for the following reaction. It can be recrystallized from petrol-ether and forms thin plates melting at 84-85° C.

EXAMPLE 4

*3,4 - (N-monobenzyl-2'-keto-imidazolido)-2-(ω-ethoxybutyl)-thiophane*

A solution containing 7.1 grams of 3,4-(1',3'-dibenzyl - 2' - keto-imidazolido)-2-(ω-ethoxybutyl)-thiophane in 20-30 cc. xylene is added to 20-30 cc. liquid ammonia cooled in a dry ice bath. To the stirred mixture is added sodium (in form of small pieces) until a persisting blue color develops (about 0.78 gram sodium is used). The last excess of sodium is destroyed with ammonium chloride, the ammonia is evaporated, and dilute sulfuric acid and ether are added. The mixture is stirred for a while and then filtered. The bulk of the reaction product remains on the funnel; a smaller part is dissolved in the ether layer of the filtrate. The latter is separated (if some product precipitates, ethyl-acetate is added), dried and concentrated in vacuo. The residue is recrystallized from acetone-ether, together with the material obtained by filtration. The product can also be recrystallized from a mixture of acetone, ether and petrol-ether. Fine needles melting at 159–160.5° C. are obtained.

EXAMPLE 5

*3,4-(N-monobenzyl - 2'-keto-imidazolido)- 2-(ω-bromo-butyl)-thiophane*

A solution of 4.6 grams 3,4-(N-monobenzyl-2'-keto-imidazolido)-2-(ω-ethoxy-butyl)-thiophane in 40 cc. 32% hydrogen bromide in acetic acid is heated on the steam bath for 3 hours. The purple solution is concentrated in vacuo, the residue dissolved in ethyl acetate, and treated with water. Ether is added to the mixture, and the precipitated crystalline bromo-compound filtered off, and washed with water and ether.

The filtrate is diluted, if necessary, with some ethyl acetate to dissolve some newly precipitated material. The organic layer is then separated and concentrated in vacuo. The crude material on the funnel and the residue from the organic layer are combined and used for the next step. The bromo-compound can be purified by recrystallization from dioxane, acetone or methanol. Needles melting at 168–169° C. are obtained.

The 3,4-(N-monobenzyl-2'-keto-imidazolido)-2-(ω-bromo-butyl)-thiophane can be converted into biotin in the same manner as set forth in our application Serial No. 673,642.

The following examples will serve to illustrate the method of preparing homo-biotin.

EXAMPLE 6

*3,4-(N-monobenzyl-2'-keto-imidazolido)-2-(ω,ω-dicarboxy-pentyl)-thiophane*

1.7 grams of sodium are dissolved in a boiling mixture of 23.1 grams diethyl malonate and 20 cc. dry dioxane. To the boiling solution is added a mixture of 200 cc. dry dioxane and 26.56 grams of 3,4-(N-monobenzyl - 2'-keto-imidazolido)-2-(ω-bromo-butyl)-thiophane.

The reaction mixture is stirred and refluxed for 6 hours, then 75 cc. 50 per cent potassium hydroxide, 60 cc. water, and some methanol are added, and the solution stirred and refluxed for 6 hours. The stirring is then continued for another 15 hours at room temperature. Water is added and any alkali insoluble by-products are extracted with ether. The aqueous alkaline solution is acidified with hydrochloric acid, and the crystalline precipitate is filtered off and washed on the funnel with some ether. The product is dried and used without further purification for the next step. It can be recrystallized from acetone with the addition of some ether. Fine needles melting at 159–161° C. are obtained.

EXAMPLE 7

*d,l-Monobenzyl-homo-biotin*

A mixture of 24.5 grams of 3,4-(N-monobenzyl-2'-keto-imidazolido)-2-(ω,ω-dicarboxy-pentyl)-thiophane and 150 cc. of ortho-dichlorobenzene (B. P. 179°) is refluxed for five minutes. The decarboxylation takes place within that time. The reaction product crystallizes out from the cooling solution, and is filtered off after a few hours and washed with acetone and ether. The mother liquors are concentrated and yield another crop of crystals. The substance is completely pure and melts at 193–194° C. It can be recrystallized from dioxane. Needles melting at 193–194° C. are obtained.

EXAMPLE 8

*d,l-Homo-biotin*

2.47 g. sodium are added in one portion to a cooled (Dry Ice-acetone) and stirred suspension of 18.7 g. d,l-monobenzyl-homo-biotin in a mixture of about 100 cc. of xylene and about 400 cc. of liquid ammonia. The excess of sodium is destroyed with ammonium chloride, after a lasting blue coloration (15 minutes) appears. The ammonia is evaporated, and water, ice, ether and then dilute hydrochloric acid are added to the residue. The acid suspension is filtered, and the precipitate is dissolved in 4 liters of boiling water. The solution is filtered at about 40° C., the precipitate being unreacted monobenzyl-homo-biotin. The solution is then extracted 3-4 times with chloroform, in order to recover the rest of the unreacted starting material. This treatment with chloroform causes only precipitation of homo-biotin. The chloroform layers are separated, and the dissolved starting material is recovered and can again be debenzylated. The precipitated homo-biotin is filtered off, the aqueous solution is concentrated and yields another portion of homo-biotin. The product is purified by dissolving in ammonium hydroxide and precipitating with hydrochloric acid. It forms needles melting at 218–220° C., and gives a melting point depression with d,l-biotin (M. P. 232–234° C.).

The following examples will serve to illustrate the production of bis- and tris-homo-biotin.

EXAMPLE 9

*3,4-(1',3'-dibenzyl-2'-keto-imidazolido)-2-hydroxy-2-(ω-ethoxyhexyl)-thiophane*

A Grignard solution, prepared from 73 g. 6-ethoxy-hexyl-bromide and an excess of magnesium (10 grams) in 70 cc. ether and 20 cc. benzene, is diluted with benzene, decanted from the unreacted magnesium, and added dropwise (within about 30 minutes) to a boiling, stirred solution of 100 grams thiolactone of 1,3-dibenzyl-4-mercaptomethyl-5-carboxy-imidazolidone-2 [3,4-(1',3'-dibenzyl-2'-keto-imidazolido)-2-keto-thiophane] in 1 liter benzene. The mixture is refluxed for another 3½ hours, and is then decomposed with ice and dilute sulfuric acid. The organic layer is separated and concentrated in vacuo, the residue is dissolved in methanol and heated to 50° C. with an excess of aqueous sodium hydroxide solution. Ether and water are added, and the two layers are separated. The alkaline aqueous solution contains the unreacted thiolactone, which is recovered after acidification. The ether layer, containing the reaction product, is dried and concentrated in vacuo. The compound is obtained as an oil.

The 6-ethoxy-hexyl-bromide employed to prepare the Grignard reagent as above described is a new compound and can be prepared in the following manner:

66.4 cc. of phosphorus tribromide are added within about one hour to 329 cc. of 6-ethoxy-hexanol-1. The temperature of the cooled mixture rises during the addition from 0° to +13°. The mixture is left at room temperature for 40 hours, and is then decomposed with ice. The heavy organic layer is separated, washed with alkali and water until neutral, and dried with anhydrous sodium sulfate. The wash-solutions are extracted with ether or benzene, and the dried extracts are combined with the main fraction. The ether is evaporated and the reaction product is distilled in vacuo. It boils at 98–100° C. at 13 mm.; $n_D^{24}=1.4545$, $d_4^{20}=1.160$.

The 6-ethoxyl-hexanol-1 is also a new compound. It can be prepared in the following manner:

104 grams sodium are introduced in portions into a stirred, refluxing mixture of 606 g. 1,6-hexane-diol and 1.5 liters toluene. When all the sodium has been introduced and most of it has reacted (3–4 hours) with formation of a heavy white precipitate, 600 cc. (960 grams) ethyl bromide are dropped in within 1 hour. The solution is stirred and refluxed for 2 hours, and the stirring is then continued at room temperature for 15 to 40 hours, until the reaction mixture is completely neutral. More ethyl bromide can be added to complete the reaction. The precipitated sodium bromide is filtered off, and is washed with toluene. The filtrate is then distilled in a vacuum of 11 mm. After distilling off the solvent, a forerun of 1,6-diethoxy-hexane boiling at 86°/12 mm. is collected (76 grams). The following main fraction is 6-ethoxy-hexanol-1, distilling at 104–105° C./12 mm. The residue consists of hexane-diol and solidifies after cooling (233 grams). 340 grams of 6-ethoxy-hexanol-1 are obtained. It is a colorless liquid with $n_D^{22}=1.4318$, and $d_4^{20}=0.890$.

EXAMPLE 10

*3,4-(1',3'-dibenzyl-2'-keto-imidazolido)-2-(ω-ethoxy-hexylidene)-thiophane*

70 g. of 3,4-(1',3'-dibenzyl-2'-keto-imidazolido)-2-hydroxy-2-(ω-ethoxy-hexyl) - thiophane, as obtained in Example 9, are refluxed for 1½ hours with 350 cc. glacial acetic acid. The solution is then concentrated in vacuo, the residue dissolved in ether, and washed with sodium hydroxide solution and water until neutral. The organic layer is separated, dried with anhydrous sodium sulfate, filtered and concentrated in vacuo. The oily dehydration product is used for the next step without further purification.

EXAMPLE 11

*3,4-(1',3'-dibenzyl-2'-keto-imidazolido)-2-(ω-ethoxy-hexyl)-thiophane*

The oily dehydration product, as obtained in Example 10, is dissolved in 100 cc. methanol and hydrogenated under atmospheric pressure at room temperature in the presence of 140 g. methanol-wet (about 70 g. dry weight) Raney nickel catalyst. After 24 hours, 2450 cc. hydrogen are absorbed. The hydrogenation is then interrupted, the mixture filtered, the Raney nickel washed with methanol, and the filtrate concentrated in vacuo. The residue is dissolved in xylene and used for the next step.

EXAMPLE 12

*3,4-(N-monobenzyl-2'-keto-imidazolido)-2-(ω-ethoxy-hexyl)-thiophane*

To a stirred mixture of liquid ammonia (about 1 liter) and a solution containing 69 grams of 3,4-(1',3'-dibenzyl-2'-keto-imidazolido) - 2 - (ω-ethoxy-hexyl)-thiophane, as obtained in Example 11, in 250 cc. xylene, sodium is added in small portions until the blue color persists (about 7.8 grams sodium are used). The excess of sodium is destroyed with ammonium chloride, the ammonia is evaporated, and water, dilute hydrochloric acid and ether are added. The mixture is stirred for a while and then filtered. The bulk of the reaction product remains on the funnel and is washed with water and ether; a smaller part is dissolved in the ether layer of the filtrate. The latter solution is separated (if some product precipitates, ethyl acetate is added), dried and concentrated in vacuo. Ether and acetone are added to the oily residue and the precipitated reaction product is filtered off. Both fractions are combined and recrystallized from methanol. Needles melting at 152–153° C. are obtained.

EXAMPLE 13

*3,4-(N - monobenzyl - 2'-keto-imidazolido)-2-(ω-bromo-hexyl)-thiophane*

A solution of 29 grams 3,4-(N-monobenzyl-2'-keto - imidazolido) - 2 - (ω-ethoxy-hexyl)-thiophane in 290 cc. 35% hydrogen bromide in acetic acid is heated for 3 hours on the steam bath. The purple solution is concentrated in vacuo, the residue is dissolved in ethyl acetate, and ether and water are added. The reaction product precipitates in fine needles. It is filtered off, washed with water and ether, dried and used without further purification for the following reactions. The product melts at 170–173° C. Upon recrystallization from dioxane, fine needles melting at 172–174° C. are obtained.

EXAMPLE 14

*3,4 - (N-monobenzyl-2'-keto-imidazolido)-2-(ω-cyano-hexyl)-thiophane)*

A mixture of 12 g. 3,4-(N-monobenzyl-2'-keto-imidazolido)-2-(ω-bromo-hexyl)-thiophane, 5.9 g. potassium cyanide and 450 cc. methanol is refluxed for 18 hours. The mixture is then acidified with dilute hydrochloric acid and concentrated until most of the methanol has evaporated. Water is added, the precipitated nitrile is filtered off, washed with water and used without further purification for the next step. The filtrate is extracted with chloroform. The chloroform solution is dried, and concentrated in vacuo. The residue is combined with the above precipitate and used for the next reaction. Upon recrystallization from dioxane, fine needles melting at 173–174.5° C. are obtained.

EXAMPLE 15

*3,4-(N - monobenzyl-2'-keto-imidazolido)-2-(ω-carboxy-hexyl)-thiophane or d,l-monobenzyl-bis-homo-biotin*

The nitrile, as obtained in Example 14, is suspended in a solution of 43 g. potassium hydroxide in 350 cc. methanol and 175 cc. water. The mixture is refluxed for 18 hours and is then concentrated until most of the methanol has distilled off. Water is added, and the alkaline solution is extracted with chloroform in order to remove all neutral material. The alkaline solution is then boiled up and acidified with concentrated hydrochloric acid. The precipitated reaction product is filtered off after 24 hours. It is then recrystallized from o-dichlorobenzene, forming needles melting at 174–176° C. Upon recrystallization from dioxane, needles melting at 174–176° C. are obtained.

EXAMPLE 16

*d,l-Bis-homo-biotin*

0.95 gram of sodium are added in one portion to a cooled (Dry Ice-acetone) and a stirred suspension of 7.5 grams of monobenzyl-bis-homo-biotin in a mixture of about 50 cc. xylene and about 200 cc. liquid ammonia. The excess of sodium is destroyed with ammonium chloride, after a lasting blue coloration (15 minutes) appears. The ammonia is evaporated, and water, ice, ether and then dilute hydrochloric acid are added to the residue. The acid suspension is filtered, and the precipitate is extracted twice with about 3 liters boiling water. The undissolved monobenzyl-bis-homo-biotin is filtered off.

The filtrate yields, after cooling, a precipitate consisting of a mixture of monobenzyl-bis-homo-biotin and bis-homo-biotin. This mixture is extracted again with several liters of boiling water, the undissolved material and the precipitate obtained after cooling being monobenzyl-bis-homo-biotin. If the precipitate still contains some debenzylated material, the procedure is repeated. The combined aqueous solutions are extracted 3–4 times with chloroform, in order to remove the dissolved part of the unreacted starting material. The chloroform layers are separated, and the extracted starting material is recovered and can again be debenzylated. The aqueous solutions are concentrated and yield bis-homo-biotin as a crystalline residue. The compound can be purified by dissolving in ammonium hydroxide and precipitating the boiling solution with hydrochloric acid. Thin plates melting at 200.5–202.5° C. are obtained.

EXAMPLE 17

*3,4-(N-monobenzyl-2'-keto-imidazolido)-2-(ω,ω-dicarboxy-heptyl)-thiophane*

0.71 gram of sodium is dissolved in a boiling mixture of 9.66 grams of diethyl malonate and 10 cc. of dry dioxane. To the boiling solution is added a mixture of 100 cc. dry dioxane and 12.0 grams of 3,4-(N-monobenzyl-2'-keto-imidazolido)-2-(ω-bromo-hexyl)-thiophane.

The reaction mixture is stirred and refluxed for six hours, then 30 cc. 50 per cent potassium hydroxide, about 30 cc. water and 30 cc. methanol are added to it, and the stirring and refluxing is continued for six hours. The mixture is then stirred for another 15 hours at room temperature. Water is added and any alkali insoluble by-products are extracted with ether. The aqueous alkaline solution is acidified with hydrochloric acid, and the crystalline precipitate is filtered off and washed on the funnel with water. The product is dried and can be used for the decarboxylation without further purification. Upon recrystallization from acetone with the addition of ether, fine needles melting with decomposition at 154° C. and resolidifying at 155° C. are obtained.

EXAMPLE 18

*d,l-Monobenzyl-tris-homo-biotin*

A mixture of about 10 grams of 3,4-(N-monobenzyl-2'-keto-imidazolido)-2-(ω,ω-dicarboxy-heptyl)-thiophane, as obtained in Example 17, and 150 cc. ortho-dichlorobenzene is refluxed for five minutes. The decarboxylation takes place within that time. The reaction product crystallizes out from the cooling solution, and is filtered off after a few hours and washed with acetone and ether. The mother liquors are concentrated and yield another crop of crystals. The substance is completely pure. M. P. 192–194° C. Upon recrystallization from dioxane, needles melting at 192–194° C. are obtained.

EXAMPLE 19

*d,l-Tris-homo-biotin*

1.12 grams of sodium are added in one portion to a cooled (Dry Ice-acetone) and stirred suspension of 9.2 grams of monobenzyl-tris-homo-biotin in a mixture of about 50 cc. xylene and about 200 cc. liquid ammonia. The excess of sodium is destroyed with ammonium chloride, after a lasting blue coloration (15 minutes) appears. The ammonia is evaporated, and water, ice, ether and then dilute hydrochloric acid are added to the residue. The acid suspension is filtered, and the precipitate consisting of monobenzyl-tris-homo-biotin and tris-homo-biotin is refluxed with about 6 liters of water.

The boiling mixture is filtered, and the undissolved monobenzyl-derivative is separated. The aqueous solution is cooled to room temperature and the crystals formed are filtered off. This precipitate melting around 205–210° C. consists of tris-homo-biotin contaminated with a small amount of the monobenzyl-derivative. In order to obtain a pure product the same procedure (refluxing with water and filtering, etc.) has to be repeated with this precipitate once or twice more. The cold aqueous solutions are extracted with chloroform, the extract is concentrated and yields pure tris-homo-biotin. The substance can be further purified by dissolving in ammonia and precipitating from the boiling solution with dilute hydrochloric acid. The completely pure tris-homo-biotin forms flat needles melting at 216° C.

d,l-Homo-biotin can also be prepared from d,l-biotin as illustrated by the following example.

EXAMPLE 20

0.4 gram of d,l-biotin is dissolved at +5° C. in 5 cc. thionyl chloride. The excess of thionyl chloride is evaporated in vacuo, benzene is added and the solution concentrated in vacuo, in order to free the acid chloride completely of any thionyl chloride left. The oily residue is then dissolved in benzene, and the solution added to an ice-cooled ether solution containing 5 m. moles of diazomethane. The mixture is stirred for 10 minutes and is then concentrated in vacuo. The yellow residue is dissolved in 100 cc. methanol, the solution refluxed, and a suspension of silver oxide in methanol, prepared from 1.0 gram silver nitrate, added in 5 portions over two hours. After addition of some activated carbon, the mixture is filtered, and the methanol solution concentrated to a small volume. 5 cc. 3 N potassium hydroxide are now added to the residue and the solution heated for one hour. Then it is treated with activated carbon, filtered and acidified. The d,l-homo-biotin precipitates in crystalline form, and is filtered off after 24 hours. Fine needles melting at 219–220° C. are obtained.

In a similar way, d-homobiotin can be prepared from d-biotin, as illustrated by the following example.

EXAMPLE 21

1.0 gram of d-biotin is dissolved at +5° C. in 10 cc. thionyl chloride. After a short while a crystalline precipitate is formed. Petrol-ether and benzene are added in order to complete the precipitation. This crystalline product is filtered off and introduced into an ice-cooled ether solution containing 16 m. moles of diazomethane. The mixture is stirred for 10 minutes and then concentrated in vacuo. The yellow residue is dissolved in 100 cc. methanol, and refluxed. A suspension of silver oxide in methanol, prepared from 2.0 grams silver nitrate, is added in 5 portions over two hours. Some activated carbon is now added, the mixture is filtered, and the methanol solution concentrated to a small volume. 10 cc. 3 N potassium hydroxide are added, and the solution heated for one hour, then treated with activated carbon, filtered and acidified. The d-homo-biotin precipitates in crystalline form, and is filtered off after 24 hours. Fine needles melting at 234.5–235° C. are obtained. The optical rotation [α]D is +89.5°±0.5° (1 per cent solution in 0.1 N sodium hydroxide).

EXAMPLE 22

*3,4-(1',3'-dibenzyl-2'-keto-imidazolido)-2-hydroxy-2-(ω-ethoxypropyl)-thiophane*

A Grignard solution, prepared from 13.6 cc. of 3-ethoxy-propyl-bromide and an excess of magnesium (4.8 grams) in 30 cc. of ether and 10 cc. of benzene, is diluted with benzene, decanted from the unreacted magnesium and added dropwise (in about 30 minutes) to a boiling, stirred solution of 27 grams of 3,4-(1',3'-dibenzyl-2'-keto-imidazolido)-2-keto-thiophane (thiolactone) in 350 cc. of benzene. The solution is refluxed for another 3½ hours. The mixture is then decomposed with ice and dilute sulfuric acid, the organic layer is separated and concentrated in vacuo. The residue is dissolved in methanol and heated to 50° C. with an excess of aqueous sodium hydroxide solution. Ether and water are added, and the two layers are separated. The alkaline aqueous solution contains the unreacted thiolactone, which is extracted and recovered after acidification. The ether layer, containing the reaction product, is dried and concentrated in vacuo. The residue is crystallized from ether, petrol-ether.

The product is soluble in strong alkali and gives a positive mercaptan test with sodium nitroprusside. It can be recrystallized from a mixture of acetone, ether and petrol-ether. Prisms melting at 114.5–115.5° C. are obtained.

EXAMPLE 23

*3,4-(1',3'-dibenzyl-2'-keto-imidazolido)-2-(ω-ethoxy-propylidene)-thiophane*

A solution of 20.0 grams of 3,4-(1',3'-dibenzyl-2'-keto-imidazolido)-2-hydroxy-2-(ω-ethoxypropyl)-thiophane in 100 cc. acetic acid is refluxed for 1½ hours. The solution is concentrated in vacuo, the residue is dissolved in ether and the solution is washed with dilute sodium carbonate solution. The ether solution is dried and concentrated in vacuo. The oily residue solidifies after a few hours. It can be recrystallized from petrol-ether and forms fine needles melting at 62.5–63.5° C.

EXAMPLE 24

*3,4-(1',3'-dibenzyl-2'-keto-imidazolido)-2-(ω-ethoxypropyl)-thiophane*

The crude 3,4-(1',3'-dibenzyl-2'-keto-imidazolido)-2-(ω-ethoxy-propylidene)-thiophane (19 grams), obtained in the preceding example, is dissolved in 150 cc. of methanol and hydrogenated in the presence of 4 grams of prehydrogenated palladium oxide at room temperature and atmospheric pressure. The calculated amount of hydrogen is taken up in about 30 hours. The catalyst is then filtered off, and the solution is concentrated in vacuo. The product solidifies after some time and is used in the crude form for the next step.

Other palladium catalysts, for example, Pd on charcoal or on barium sulfate, and also Raney nickel can be used instead of palladium oxide.

EXAMPLE 25

*3,4-(N-monobenzyl-2'-keto-imidazolido)-2-(ω-ethoxy-propyl)-thiophane*

To a stirred mixture of liquid ammonia (about 20 cc.), and a solution containing 1.4 grams of crude 3,4-(1',3'-dibenzyl-2'-keto-imidazolido)-2-(ω-ethoxy-propyl)-thiophane in 10–20 cc. xylene, sodium is added in small portions until the blue color persists (about 0.166 gram sodium is used). The last excess of sodium is destroyed with ammonium chloride, the ammonia is evaporated, and dilute sulfuric acid and ether are added. This mixture is stirred for a while and then filtered. The bulk of the reaction product remains on the funnel; a smaller part is dissolved in the ether layer of the filtrate. The ether solution is separated (if some product precipitates, ethyl acetate is added), dried and concentrated in vacuo. The residue is recrystallized from acetone ether, together with the product obtained by filtration. Needles melting at 136–137° C. are obtained.

The acetyl derivative of this product can be prepared in the following way: 1 gram of the monobenzyl-compound and 4 grams of barium carbonate are stirred and refluxed for 1½ hours with 20 cc. acetic anhydride and 20 cc. acetyl chloride. The mixture is cooled, filtered, concentrated, and the residue is recrystallized from a mixture of benzene and petrol-ether. Needles melting at 85–85.5° C.

When 3,4-(1',3'-dibenzyl- or N-monobenzyl-2'-keto-imidazolido)-2-(ω-ethoxy-propyl-thiophane is halogenated, it does not form the corresponding 2-(ω-halogeno-propyl)-thiophane, but 3,4-(1',3'-dibenzyl- or N-monobenzyl-2'-keto-imidazolido)-1,2-trimethylene-thiophanium halide, as is described in our application, Serial No. 763,446, filed July 24, 1947. These two last mentioned compounds, when subjected to an A-series of reactions according to the flow sheet above, form nor-biotin, and when subjected to a B-series of reactions, form biotin. This is described in more detail in our aforementioned application, and is illustrated by the following examples which correspond to Examples 22, 23, 25, 26, 28, 29 and 30 of said application:

EXAMPLE 26

*3,4-(1',3'-dibenzyl-2'-keto-imidazolido)-1,2-trimethylenethiophanium bromide*

A solution of 5 grams of 3,4-(1',3'-dibenzyl-2'-keto-imidazolido)-2-(ω-ethoxypropyl)-thiophane in 50 cc. of an 18 per cent solution of hydrogen bromide in acetic acid is heated for three hours to 60° C. The solution is concentrated in vacuo, and treated with water and benzene. The mixture is cooled to +5° C. and the precipitated crystalline reaction product is filtered off and washed with benzene and cold water. A further amount of the product can be obtained by concentrating the aqueous part of the mother liquors (the benzene layer contains only impurities). The product can be recrystallized from water. Thick plates melting at 220–222° C. are obtained.

EXAMPLE 27

*3,4-(1',3'-dibenzyl-2'-keto-imidazolido)-1,2-trimethylene-thiophanium chloride*

4.2 grams of crude 3,4-(1',3'-dibenzyl-2'-keto-imidazolido)-2-(ω-ethoxy-propyl)-thiophane are dissolved in 50 cc. of 99 per cent formic acid saturated with hydrogen chloride (about 5 per cent). The solution is heated for two hours to 50–60° C., and is then concentrated in vacuo. The residue is dissolved in water and extracted with ether to remove impurities. The aqueous solution is concentrated to dryness, and the residue is recrystallized from aqueous acetone. Prisms melting at 158–159° C. are obtained. The product is very soluble in water.

EXAMPLE 28

*3,4-(monobenzyl-2'-keto-imidazolido)-1,2-tri-methylene-thiophanium bromide*

A solution of 5 grams of 3,4-(monobenzyl-2'-keto-imidazolido)-2-(ω-ethoxypropyl)-thiophane in 50 cc. of an 18 per cent solution of hydrogen bromide in acetic acid is heated for three hours at 60° C. The solution is concentrated in vacuo and treated with benzene and water. The aqueous layer is separated and concentrated in vacuo. The residue is recrystallized from alcohol, or a mixture of alcohol and dioxane. Prisms melting at 167–167.5° C. are obtained.

EXAMPLE 29

*3,4-(monobenzyl-2'-keto-imidazolido)-1,2-tri-methylene-thiophanium chloride*

A solution of 4.0 grams of 3,4-(monobenzyl-2'-keto-imidazolido)-2-(ω-ethoxypropyl)-thiophane in 100 cc. of 99 per cent formic acid saturated with hydrogen chloride is kept at room temperature for 48 hours and is then heated for 2 hours at 50° C. The solution is then concentrated in vacuo, and the residue is treated with water. The aqueous solution is filtered, extracted with ethyl acetate, in order to remove all unreacted starting material, and is then concentrated in vacuo. The crystalline residue is recrystallized from a mixture of water, ethanol and ether. Prisms melting at 158–160° C. are obtained. The product softens around 130° C. and resolidifies again.

EXAMPLE 30

*3,4-(1',3'-dibenzyl-2'-keto-imidazolido)-2-(ω-cyanopropyl)-thiophane*

4.45 grams of 3,4-(1',3'-dibenzyl-2'-keto-imidazolido)-1,2-trimethylene-thiophanium bromide, 3.2 grams of potassium cyanide, 250 cc. of alcohol and 30 cc. of water are refluxed for eight hours. The clear solution is concentrated on the steam bath to a volume of about 70 cc., concentrated hydrochloric acid being added at the same time in order to destroy the excess potassium cyanide. About 800 cc. of water are added, and the precipitated oil is extracted several times with chloroform and ethyl acetate. After drying and concentrating the organic extract in vacuo, an oily residue weighing about 4 grams is obtained. This material is used without further purification for the next step of the synthesis.

EXAMPLE 31

*d,l-Dibenzyl-nor-biotin*

About 4 grams of impure 3,4-(1',3'-dibenzyl-2'-keto-imidazolido)-2-(ω-cyanopropyl)-thiophane, 11 grams of potassium hydroxide, 80 cc. of methanol and 50 cc. of water are refluxed for 17 hours. The clear solution is concentrated on the steam bath to a volume of about 25 cc. Water is then added and the neutral by-products extracted with ethyl acetate and chloroform. The aqueous solution is then acidified with concentrated hydrochloric acid and extracted with ethyl acetate and chloroform. The combined extracts are concentrated in vacuo, leaving an oily residue of 3.2 grams. This oil crystallizes from a mixture of acetone, ether and petrol-ether. After several such recrystallizations, the product melts at 118–120° C. Large flat plates are obtained.

EXAMPLE 32

*d,l-Nor-biotin*

3.2 grams of crude d,l-dibenzyl-nor-biotin, dissolved in 30 cc. of warm purified ethylene glycol diethyl ether are added dropwise with stirring into 200 cc. of liquid ammonia. A very fine suspension of the ammonium salt of d,l-dibenzyl-biotin is formed. The reaction mixture is stirred and 500 mg. sodium are added rapidly in small pieces. After stirring for 10 minutes, the blue color disappears. The solution is stirred for 20 minutes, then 1.2 grams ammonium chloride are added, and the mixture stirred again for 30 minutes. This process is repeated three times in all. After distilling off the ammonia, water is added, and sufficient concentrated hydrochloric acid to bring the solution to pH 1. The product is filtered off and washed with chloroform and ethyl acetate. The aqueous filtrate is extracted with chloroform and concentrated in vacuo until crystals appear. Both precipitates are dissolved with stirring in about 300 cc. boiling water. The hot solution is filtered from insoluble material, and then stirred with chloroform. The chloroform is separated, the aqueous layer filtered and concentrated in vacuo, until crystallization begins. After standing at 4° C. for 24 hours, the product is filtered off, washed with water and then with ether on the suction funnel. M. P. 230–233° C.

On concentrating the aqueous filtrate and cooling, 50 mg. of less pure d,l-nor-biotin are obtained, melting at 227° C. d,l-Nor-biotin gives a melting point depression of about 20° C. with d,l-biotin.

We claim:

1. A compound of the following general formula:

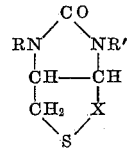

wherein R and R' stand for a member of the group consisting of hydrogen and a hydrogen-replaceable radical selected from the group consisting of aralkyl and lower acyl radicals, and X stands for a member of the group consisting of =C(OH)-ω-alkoxy-alkyl
=C=CH-ω-alkoxy-alkyl
=CH-ω-alkoxy-alkyl
=CH-ω-halogeno-alkyl
=CH-ω-cyano-alkyl
=CH-ω,ω-dicarbalkoxy-alkyl
=CH-ω,ω-dicarboxy-alkyl
=CH-ω-carboxy-alkyl and wherein when X is =CH-ω-alkoxy-alkyl and =CH-ω-halogeno-alkyl, at least one of R and R' is a hydrogen-replaceable radical, and wherein when X is =CH-ω-carboxy-alkyl and R and R' are both hydrogen, the alkyl contains one of the following: 3, 5, 6 and 7 carbon atoms.

2. Homo-biotin.
3. Bis-homo-biotin.
4. Nor-biotin.
5. A process which comprises reacting a 3,4-

[(1'-R, 3'-R')-2'-keto-imidazolido]-2-keto-thiophane with an ω-alkoxy-alkyl-magnesium halogenide to form a 3,4-[(1'-R,3'-R')-2'-keto-imidazolido]-2-hydroxy - 2 - (ω-alkoxy-alkyl)-thiophane, splitting out one molecule of water from said compound to yield a 3,4-[(1'-R,3'-R')-2'-keto-imidazolido]-2-(ω-alkoxy-alkylidene) - thiophane, hydrogenating said unsaturated compound to a 3,4-[(1'-R,3'-R')-2-keto-imidazolido]-2-(ω-alkoxy-alkyl)-thiophane, halogenating the last mentioned compound by treatment with a halogen acid and converting the reaction product to a 3,4-[(1'-R, 3'-R')-2-keto-imidazolido]-2-(ω-substituted-alkyl)-thiophane wherein the ω-substituent is selected from the group consisting of a cyano, CH(COOalkyl)$_2$, CH(COOH)$_2$ and COOH radical, R and R' standing for a member of the group consisting of hydrogen and hydrogen-replaceable radicals selected from the group consisting of aralkyl and lower acyl radicals, at least one of R and R' being a hydrogen-replaceable radical, and replacing any of the said hydrogen-replaceable radicals by hydrogen.

6. In a process for producing 3,4-(2'-keto-imidazolido)-2-(ω-carboxyalkyl)-thiophanes, the step which comprises replacing in a 3,4-[(1'-R,-3'-R')-2'-keto-imidazolido]-2-(ω-carboxyalkyl)-thiophane, wherein R and R' stand for a member of the group consisting of hydrogen and a hydrogen-replaceable radical selected from the group consisting of aralkyl and lower acyl radicals, at least one of R and R' being a hydrogen-replaceable radical, any of the said hydrogen-replaceable radicals with hydrogen.

7. In a process for preparing 3,4-(2'-keto-imidazolido)-2-(ω-carboxyalkyl)-thiophanes, the steps which comprise reacting a 3,4-[(1'-R, 3'-R')-2'-keto-imidazolido] - 2 - (ω-halogeno-alkyl)-thiophane with an alkali metal cyanide to form a 3,4-[(1'-R,3'-R')-2'-keto-imidazolido]-2-(ω-cyano-alkyl)-thiophane and hydrolyzing the latter compound to form a 3,4-[(1'-R,3'-R')-2'-keto-imidazolido] - 2 - (ω - carboxy - alkyl)-thiophane, R and R' standing for a member of the group consisting of hydrogen and hydrogen-replaceable radicals selected from the group consisting of aralkyl and lower acyl radicals, at least one of R and R' being a hydrogen-replaceable radical.

8. In a process for producing 3,4-(2'-keto-imidazolido)-2-(ω-carboxyalkyl) - thiophanes, the steps which comprise reacting a 3,4-[(1'-R, 3'-R')-2'-keto-imidazolido] - 2 - (ω-halogeno-alkyl)-thiophane with a dialkyl metallo-malonate to form a 3,4-[(1'-R, 3'-R')-2'-keto-imidazolido]-2-(ω,ω-dicarbalkoxy-alkyl)-thiophane, hydrolyzing and removing one carboxy group from the last mentioned compound to form a 3,4-[(1'-R,3'-R') - 2' - keto-imidazolido] - 2 - (ω-carboxy-alkyl)-thiophane, R and R' standing for a member of the group consisting of hydrogen and hydrogen-replaceable radicals selected from the group consisting of aralkyl and lower acyl radicals, at least one of R and R' being a hydrogen-replaceable radical.

9. A process as in claim 5, wherein R and R' stand for benzyl.

10. A process as in claim 7, wherein R and R' stand for benzyl.

11. A process as in claim 8, wherein R and R' stand for benzyl.

12. The process which comprises decarboxylating 3,4-(N-monobenzyl-2'-keto-imidazolido)-2-(ω,ω-dicarboxy-pentyl)-thiophane to form monobenzyl-homo-biotin, and debenzylating the last mentioned compound to form homo-biotin.

13. The process which comprises hydrolyzing 3,4-(N-monobenzyl - 2' - keto-imidazolido)-2-(ω-cyanohexyl)-thiophane to form monobenzyl bis-homo-biotin, and debenzylating the last-mentioned compound.

14. The process which comprises hydrolyzing 3,4-(1',3'-dibenzyl-2'-keto-imidazolido)-2-(ω-cyanopropyl)-thiophane to form dibenzyl-nor-biotin, and debenzylating the last-mentioned compound to form nor-biotin.

MOSES WOLF GOLDBERG.
LEO H. STERNBACH.

REFERENCES CITED

The following references are of record in the file of this patent:

UNITED STATES PATENTS

| Number | Name | Date |
|---|---|---|
| 2,417,326 | Schneider et al. | Mar. 11, 1947 |

Certificate of Correction

Patent No. 2,489,236                                November 22, 1949

MOSES WOLF GOLDBERG ET AL.

It is hereby certified that errors appear in the printed specification of the above numbered patent requiring correction as follows:

Column 3, Formula VII, lower right-hand portion thereof, for

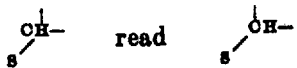

column 5, line 58, after "reacted" strike out "with"; column 9, line 5, for "6-ethoxyl-" read *6-ethoxy-*; column 14, line 32, after "85–85.5° C." insert the words and period *are obtained.*; line 34, for "ethoxy-propyl-" read *ethoxy-propyl)-*;

and that the said Letters Patent should be read with these corrections therein that the same may conform to the record of the case in the Patent Office.

Signed and sealed this 4th day of April, A. D. 1950.

[SEAL]

THOMAS F. MURPHY,
                                                          *Assistant Commissioner of Patents.*